Figure 1:
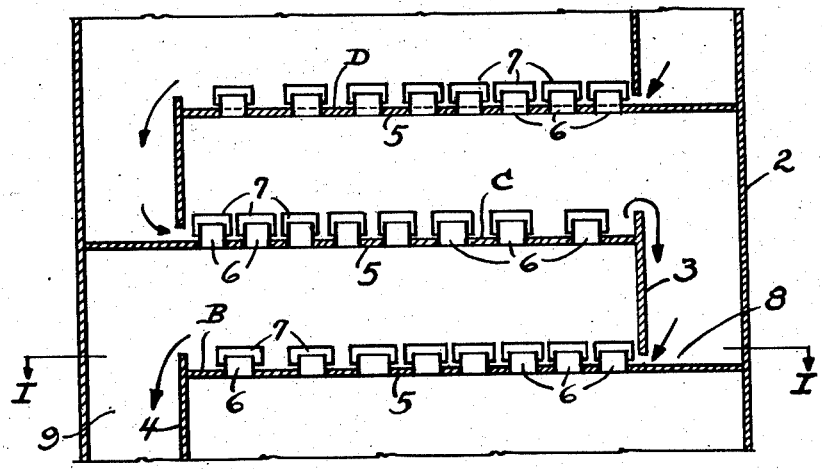
Figure 1:
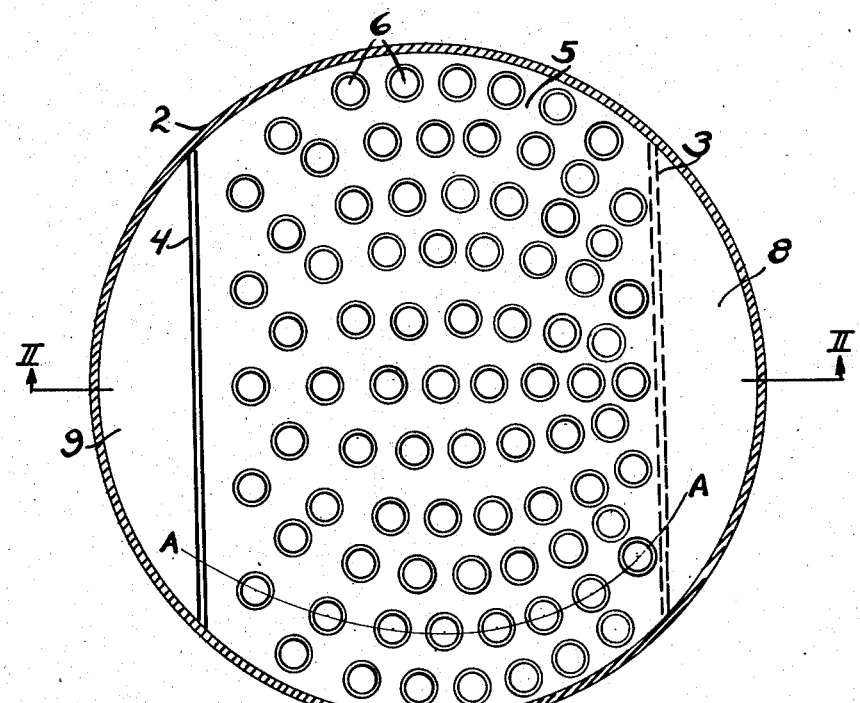

May 1, 1945.    J. W. PACKIE ET AL    2,374,950
FRACTIONATING APPARATUS
Filed Feb. 25, 1943

FIG.-II

Patented May 1, 1945

2,374,950

UNITED STATES PATENT OFFICE 2,374,950

FRACTIONATING APPARATUS

John W. Packie, Green Village, and Lester S. Gibbs, Cranford, N. J., assignors to Standard Oil Development Company, a corporation of Delaware Application February 25, 1943, Serial No. 477,098

7 Claims. (Cl. 261—114)

The present invention relates to an improved fractionation apparatus for carrying out distillation processes. The invention is concerned primarily with an apparatus for improving the quality of the several fractions obtained in fractional distillation operations and is applicable in any process wherein fractionating equipment is employed. Specifically, the distillation processes of crude or rerun petroleum refinery stocks, the fractionation of cracked refinery stocks, the debutanization and stabilization of naphtha, the manufacture of alcohols, the production of coal tar solvents, of organic chemicals, of lacquer solvents, of cleaning solvents, and the like, are examples of the types of processes in which the novel fractionation equipment employed therein is applicable. More particularly, the particular type of fractionating equipment employed is that of a fractionating tower having a plurality of fractionating elements spaced on a plurality of fractionating trays.

In the past these trays of fractionating towers have been equipped with fractionating elements uniformly spaced across the surface of each tray. Various sizes and shapes of fractionating elements such as circular, oblong, square, triangular, hexagonal and trough type bubble caps have been used but in all cases these elements have been evenly distributed across each tray on triangular, diamond or square centers or in straight rows. A number of different arrangements have in the past been employed for reducing the liquid gradient across the fractionating trays, such as split flow trays, multi-level trays and trays with multiple central and outer downcomer pipes. Each of these systems or schemes has been designed to overcome certain difficulties and inefficiencies in fractionating equipment of the bubble cap-tray type and while certain of these expedients have overcome one or more of the disadvantages they have done so while sacrificing other important desirable features of such fractionating equipment. The present invention relates to a normal tray of a fractionating tower containing a plurality of bubble caps with the liquid entering one side of the tray, flowing across the tray and leaving the tray at the opposite side by an overflow or weir means. Now in the course of operation of such a tray the resistance to the liquid flow set up by the bubble caps or other fractionating elements and the vapors bubbling through the liquids results in a liquid gradient across the tray, that is, there is a greater depth of liquid at the inlet side of the tray than at the outlet side, and this liquid gradient causes less vapor to flow through the elements on the inlet side of the tray than on the outlet side due of course to the greater static head of liquid to be overcome on the inlet side of the tray. In fact, the gradient may even become large enough to cause the fractionating elements on the inlet side of the tray to become completely inactive, i. e., no vapors passing through them. The disadvantages of such a condition are of course reduced tower capacity, a greater entrainment of liquid in vapor, resulting in poor fractionation and a cross-flow of the vapors from one side of the tower to the other as they pass through the outlet half of each succeeding tray. Such cross-flow of vapors results in uneven tower operation, tends to cause the liquid gradient on each tray to increase, thereby aggravating the condition heretofore mentioned, and at times this liquid gradient is increased to such an extent that the liquid even flows down through the vapor passages in the fractionating elements, thus by-passing its normal path across the tray.

It is an object of the present invention to overcome these disadvantages, to increase the efficiency of tray type fractionating columns, to provide increased capacity for a given diameter column, to provide a more uniform operation, to minimize the entrainment of liquids in vapors, and to improve in general the fractionating operation of the tower. It is a further object of the invention to so arrange the fractionating elements on each tray of the tower as to provide an opportunity for the liquid crossing the tray to reach the outer edges of the tray and to prevent "channeling" of the liquid from the inlet weir of any given tray toward the outlet weir. It is a further object of the invention to so position the fractionating elements in each section of the tray so as to reduce the amount of splashing and accordingly the entrainment on that section.

These objects, as well as other objects which will be apparent upon a fuller understanding of the invention hereinafter more fully described, are accomplished by employing a novel construction of a fractionating tray with the bubble cap fractioning elements spaced in a novel manner thereon. According to the present invention fewer fractionating elements are employed on the outlet half of the fractionating tray than on the inlet half of that same tray. As previously pointed out, in the normal operation a fractionating element on the outlet side of the tray handles a larger amount of vapor than a similar element on the inlet side due to the greater head of liquid on the tray at the inlet side. To accomplish one of the objects of the invention, namely, a substantially uniform upflow of vapors through each section of any given fractionating tray, although the fractionating elements on the inlet half will handle less vapor than those on the outlet half, by increasing the number of elements on the inlet half of the tray and decreasing the number of elements on the outlet half of the tray substantially the same quantity of vapor will pass through each section of the fractionating tray and thus avoid the disadvantages heretofore mentioned. In practical operations, however, actually the number of caps on the inlet half of the tray may be decreased while the number on the outlet half may be decreased more drastically. It is proposed, therefore, to graduate the spacing of the fractionating elements across the tray to permit the total quantities of vapors passing through any section of the tray to essentially equal that passing through any other section of equal area on the tray. To insure a good vapor distribution throughout the tray it has been found that the number of fractionating elements on the outlet half of the tray should usually be between about 65% and about 75% of the number spaced on the inlet half of the tray, although good operation may be accomplished and the objects of the invention achieved if only about half as many fractionating elements are spaced on the outlet half of the tray as are distributed on the inlet half of the tray. The invention is not limited to any particular type of cap and tray but covers the use of any of the conventional sizes and shapes of fractionating elements and trays employed and the invention may be used in practionating towers operating under vacuum, atmospheric pressures or superatmospheric pressures, and in towers operating at any desired temperature chosen with respect to the particular fractionating problem to be handled.

In order to insure a more uniform distribution of liquid across the tray and to insure substantially the same amount of liquid flowing to the outer edges of a tray as that flowing across the center of the tray, the fractionating elements in addition to being spaced with respect to the inlet and outlet halves of each tray as above stated are also placed in rows of caps radiating from the inlet weir of the tray, conforming to the contour of the tray and converging at the outlet side so that the liquid proportions itself in flowing across the tray to the outer edges of the tray as well as toward the center of the tray, which is of course the shortest path across the tray. As previously mentioned, by positioning and spacing the fractionating elements on wider centers on the outlet side of the tray where each element handles a larger than average quantity of vapors, the amount of splashing is reduced, and since the majority of the entrainment on a tray with uniformly spaced elements occurs at the outlet side of the tray, this reduction in entrainment is of considerable importance in that it results in improved fractionation.

For a greater understanding of the apparatus for carrying out one mode of operation, reference is made to the accompanying drawing in which Fig. 1 is a horizontal section taken substantially on the line I—I of Fig. 2, with the bubble caps 7 removed; and Fig. 2 is a vertical section of a portion of a fractionating tower taken on the line II—II of Fig. 1.

In Fig. 1, a plate 5 is supported to the walls 2 of a fractionating tower, the said plate having an inlet section 8 bounded by the walls of the fractionating tower and by the inlet weir 3 and an outlet section 9 bounded by the walls of the fractionating tower and outlet weir 4. Between the inlet and outlet weirs there are several vapor passages or chimneys 6 positioned on the plate so that fewer are on the outlet side of the plate than are on the inlet side of the plate. In addition to the vapor passages being fewer in number and spaced farther apart on the outlet half of the plate than on the inlet half, the passages are positioned on the plate in an arc running parallel to the outer edges of the plate in rows, as for example the row designated A—A, with the middle row passing through the center of the plate being substantially straight. The arc which the rows of vapor passages are aligned upon runs parallel to the contour of the outer wall 2 of the fractionating tower.

In Fig. 2 the same numerals are employed to identify the same parts as disclosed and identified in Fig. 1. In addition, Fig. 2 shows the bubble caps 7 positioned on the vapor passages in plate 5 and also shows the relative position of inlet and outlet weirs and the positioning of the bubble caps with respect to those weirs as between several plates of a bubble cap tray type fractionating tower. Thus, plates B and D are identical in position and bubble cap arrangement, while plate C, although identical in construction to plates B and D, is positioned at 180° rotation in the horizontal plane from the position of plates B and D. Actually Figures I and II are more or less diagrammatic representations but in order to clearly set forth the invention the various structures are somewhat exaggerated with respect to their relative positions. The bubble caps and chimneys on the inlet side of the plates in the figures are too close together for practical operations.

In order to illustrate the operation and improved results obtained in practicing a fractionating operation when employing bubble cap trays with fractionating elements arranged according to the teachings of the present invention as compared with the conventional bubble cap tray with uniformly spaced fractionating elements, the following example is submitted.

*Example*

A single bubble cap tray from a fractionating tower of commercial size having 19 trays of 16 feet 6 inches in diameter was operated using water as the liquid and air as the vapor, atmospheric temperature being employed, with the following results:

|  | Bubble caps uniformly distributed over surface of tray | Fewer bubble caps on outlet side of tray than on inlet side |
| --- | --- | --- |
| Number of 6-inch bubble caps on inlet half of tray | 47 | 55 |
| Number of 6-inch bubble caps on outlet half of tray | 46 | 38 |
| Total number of caps on tray | 93 | 93 |
| Water rate, gallons per hour per foot of tower diameter | 9,600 | 9,650 |
| Average air rate, cubic feet per minute per cap | 184 | 179 |
| Liquid gradient (inlet depth to outlet depth) inches | 4⅝ | 4⅝ |
| Height of splashing above tray, inlet half feet | 5 | 4 |
| Height of splashing above tray, outlet half feet | 6 | 3 |

The above effects are greatly magnified when more than one plate is used due to the cross flow of vapors when the caps are spaced uniformly.

Having thus described and illustrated the character of the invention, what is desired to be secured by Letters Patent is:

1. A fractionating tower, vertically spaced plates in said tower, a plurality of fractionating elements in each of said plates, each plate being provided with an inlet for liquid on one side and an outlet for liquid on the opposite side, the fractionating elements being arranged on normal centers on the inlet side of each plate and farther apart adjacent the outlet.

2. A fractionating tower as in claim 1 wherein the inlet of each plate connects to the outlet of the next higher plate and the outlet of each plate connects to the inlet of the next lower plate.

3. A plate adapted for use in a fractionating tower, said plate being provided with an inlet and an outlet for liquid, said inlet and outlet being oppositely placed with respect to the center of said plate, a plurality of fractionating elements in said plate adapted to permit vapors to flow through openings in said plate, said fractionating elements being arranged farther apart toward the said liquid outlet.

4. A plate as in claim 3 wherein the fractionating elements are arranged in said plate so that the number on the outlet half of said plate is between 50% and 75% of the number on the inlet half of said plate.

5. A plate as in claim 3 wherein the fractionating elements are arranged in said plate so that the number on the outlet half of said plate is between 50% and 75% of the number on the inlet half of said plate, said fractionating elements being in rows, the rows farther away from the center of the plate running substantially parallel to the curvature of the outer portion of said plate, the inner rows being of lesser curvature as they approach the center of the plate.

6. A plate adapted for use in a fractionating tower, said plate being provided with an inlet and an outlet for liquid, said inlet and outlet being oppositely placed with respect to the center of said plate, a plurality of bubble caps in said plate, said caps being so arranged that fewer are on the outlet half than on the inlet half of said plate, whereby the total volume of vapors passing through any given area of said plate is substantially equal to that passing through any other equal size area of said plate.

7. A plate as in claim 6 wherein between 50% and 75% of the number of caps on the inlet half of said plate are present on the outlet half of said plate.

JOHN W. PACKIE.
LESTER S. GIBBS.